(12) United States Patent
Attwell et al.

(10) Patent No.: US 9,898,499 B2
(45) Date of Patent: Feb. 20, 2018

(54) MULTIMEDIA SCHEDULING FOR AIRPLAY WITH ALTERNATE CATEGORY SUPPORT

(71) Applicant: iHeartMedia Management Services, Inc., San Antonio, TX (US)

(72) Inventors: Nigel Attwell, Goldens Bridge, NY (US); Wiliam Wallace Webber, Jr., Tarrytown, NJ (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 378 days.

(21) Appl. No.: 14/809,663

(22) Filed: Jul. 27, 2015

(65) Prior Publication Data

US 2015/0331900 A1 Nov. 19, 2015

Related U.S. Application Data

(63) Continuation-in-part of application No. 13/850,858, filed on Mar. 26, 2013, now Pat. No. 9,092,264, which is a continuation of application No. 12/856,952, filed on Aug. 16, 2010, now Pat. No. 8,418,182.

(51) Int. Cl.
| | |
|---|---|
| *G06F 9/46* | (2006.01) |
| *G06F 17/30* | (2006.01) |
| *H04L 29/06* | (2006.01) |
| *H04H 60/06* | (2008.01) |
| *H04H 60/47* | (2008.01) |

(52) U.S. Cl.
CPC .. *G06F 17/30371* (2013.01); *G06F 17/30053* (2013.01); *G06F 17/30772* (2013.01); *H04H 60/06* (2013.01); *H04L 65/4084* (2013.01); *H04L 65/4092* (2013.01); *H04H 60/47* (2013.01)

(58) Field of Classification Search
None
See application file for complete search history.

(56) References Cited

U.S. PATENT DOCUMENTS

| | | |
|---|---|---|
| 7,412,532 B2 | 8/2008 | Gondhalekar et al. |
| 7,610,011 B2 | 10/2009 | Albrett |

(Continued)

*Primary Examiner* — Adam Lee
(74) *Attorney, Agent, or Firm* — Garlick & Markison; Edward J. Marshall

(57) ABSTRACT

A device and method for resolving a conflict in a chronological scheduling order for airplay while with constant order of the multimedia. A scheduling order can be designated for the delivery and playback of multimedia content (e.g., music, news, other audio, advertising, etc) with respect to particular slots within the scheduling order. Conflict resolution between multimedia content is based upon exchanging a slot position of either of one of a first set and one of a second set of a category of multimedia content identifiers with another corresponding one of either of the first set and the second set of the multimedia content identifiers based upon a predetermined number of slot value to resolve the conflict and to modify at least the portion of the chronological scheduling order while adhering to constant order for the multimedia content. Modified portions of the chronological scheduling order are produced for eventual airplay of multimedia content corresponding to the multimedia content identifiers.

17 Claims, 11 Drawing Sheets

(56) References Cited

U.S. PATENT DOCUMENTS

| | | | |
|---|---|---|---|
| 8,180,469 B1 | 5/2012 | Fitch et al. | |
| 8,401,072 B2 | 3/2013 | Shibata et al. | |
| 2002/0023274 A1 | 2/2002 | Giacalone | |
| 2002/0138630 A1 | 9/2002 | Solomon et al. | |
| 2003/0000369 A1* | 1/2003 | Funaki | G10H 1/0058 84/609 |
| 2003/0105809 A1 | 6/2003 | Yoshii et al. | |
| 2005/0108770 A1* | 5/2005 | Karaoguz | H04L 29/06027 725/131 |
| 2005/0154625 A1 | 7/2005 | Chua et al. | |
| 2006/0026052 A1 | 2/2006 | Klett et al. | |
| 2006/0239640 A1 | 10/2006 | Watanabe et al. | |
| 2007/0118590 A1 | 5/2007 | Giacalone | |
| 2007/0130009 A1* | 6/2007 | Steelberg | G06Q 30/0247 705/14.46 |
| 2007/0214182 A1* | 9/2007 | Rosenberg | G06F 17/30749 |
| 2008/0229317 A1 | 9/2008 | Hodson | |
| 2009/0097819 A1 | 4/2009 | Dui et al. | |
| 2009/0129402 A1 | 5/2009 | Moller et al. | |
| 2009/0175591 A1 | 7/2009 | Gondhalekar et al. | |
| 2009/0187951 A1* | 7/2009 | McCarthy | H04N 5/76 725/58 |
| 2009/0190898 A1 | 7/2009 | Saito | |
| 2009/0198358 A1 | 8/2009 | Logan et al. | |
| 2009/0241142 A1* | 9/2009 | Schuster | G06Q 30/02 725/32 |
| 2009/0319370 A1* | 12/2009 | Jain | G06F 17/30029 705/14.54 |
| 2010/0010997 A1* | 1/2010 | Amidon | G06F 17/30038 707/E17.002 |
| 2010/0037253 A1* | 2/2010 | Sheehan | H04H 20/103 725/31 |
| 2010/0070996 A1 | 3/2010 | Liao et al. | |
| 2010/0082376 A1 | 4/2010 | Levitt | |
| 2010/0211442 A1* | 8/2010 | Venkataraman | G06F 17/30029 705/14.5 |
| 2010/0268361 A1 | 10/2010 | Mantel et al. | |
| 2011/0055883 A1* | 3/2011 | Foti | H04N 7/17318 725/110 |
| 2012/0042316 A1 | 2/2012 | Attwell | |
| 2012/0089730 A1 | 4/2012 | Bodi et al. | |
| 2012/0109743 A1* | 5/2012 | Balakrishnan | G06Q 30/0241 705/14.44 |
| 2012/0150614 A1* | 6/2012 | Dion | G06F 17/30029 705/14.32 |

* cited by examiner

FIG. 4

Category Group Options

| Pass Order | Group | Reverse Schedule ▾ | Slot... | Timing | Stacking | Depth % | Research |
|---|---|---|---|---|---|---|---|
| 1 | A | ☐ | ☑ | ☐ | | | 30 |
| 2 | B | ☑ | ☐ | ☐ | Hour | 1 | 999 |
| 3 | <Theme> | ☑ | ☐ | ☐ | | | |
| 4 | <Twofer> | ☑ | ☐ | ☐ | | | |

Station | Dayparts | Packets | House Restrictions | Research | Artist Image | Browse Formats | Hold Categories

Definition | Assignment | Regions | No Repeat

| Assigned | Name | Reverse Schedule | Group | Region |
|---|---|---|---|---|
| ✓ | AM Drive | ☑ | 1 | Normal |
| ✓ | Mid-day | ☐ | 1 | Normal |
| ✓ | PM Drive | ☐ | 1 | Normal |
| ✓ | Night | ☐ | 1 | Normal |
| ✓ | Overnight | | 1 | Normal |

| 12M | 1A | 2A | 3A | 4A | 5A | 6A | 7A | 8A | 9A | 10A | 11A | 12A | 1P | 2P | 3P | 4P | 5P | 6P | 7P |
|---|---|---|---|---|---|---|---|---|---|---|---|---|---|---|---|---|---|---|---|
| 123 | 451 | 234 | 512 | 345 | 123 | 451 | 234 | 512 | 345 | 123 | 451 | 234 | 512 | 345 | 123 | 451 | 234 | 512 | |

FIG. 6B

| 12M | 1A | 2A | 3A | 4A | 5A | 6A | 7A | 8A | 9A | 10A | 11A | 12A | 1P | 2P | 3P | 4P | 5P | 6P | 7P |
|---|---|---|---|---|---|---|---|---|---|---|---|---|---|---|---|---|---|---|---|
| | | | | | | | | | | | | | | | | | | | 215 |

FIG. 6C

| 12W | 1A | 2A | 3A | 4A | 5A | 6A | 7A | 8A | 9A | 10A | 11A | 12N | 1P | 2P | 3P | 4P | 5P | 6P | 7P |
|---|---|---|---|---|---|---|---|---|---|---|---|---|---|---|---|---|---|---|---|
| 123 | 451 | 234 | 512 | 345 | 123 | 451 | 234 | 512 | 345 | 123 | 451 | 234 | 512 | 345 | 123 | 451 | 234 | 124 | 215 |

FIG. 6D

| 12W | 1A | 2A | 3A | 4A | 5A | 6A | 7A | 8A | 9A | 10A | 11A | 12N | 1P | 2P | 3P | 4P | 5P | 6P | 7P |
|---|---|---|---|---|---|---|---|---|---|---|---|---|---|---|---|---|---|---|---|
|  |  |  |  |  |  |  |  |  |  |  |  |  |  |  |  |  |  |  | 215 |

FIG. 6F multimedia content identifier 700

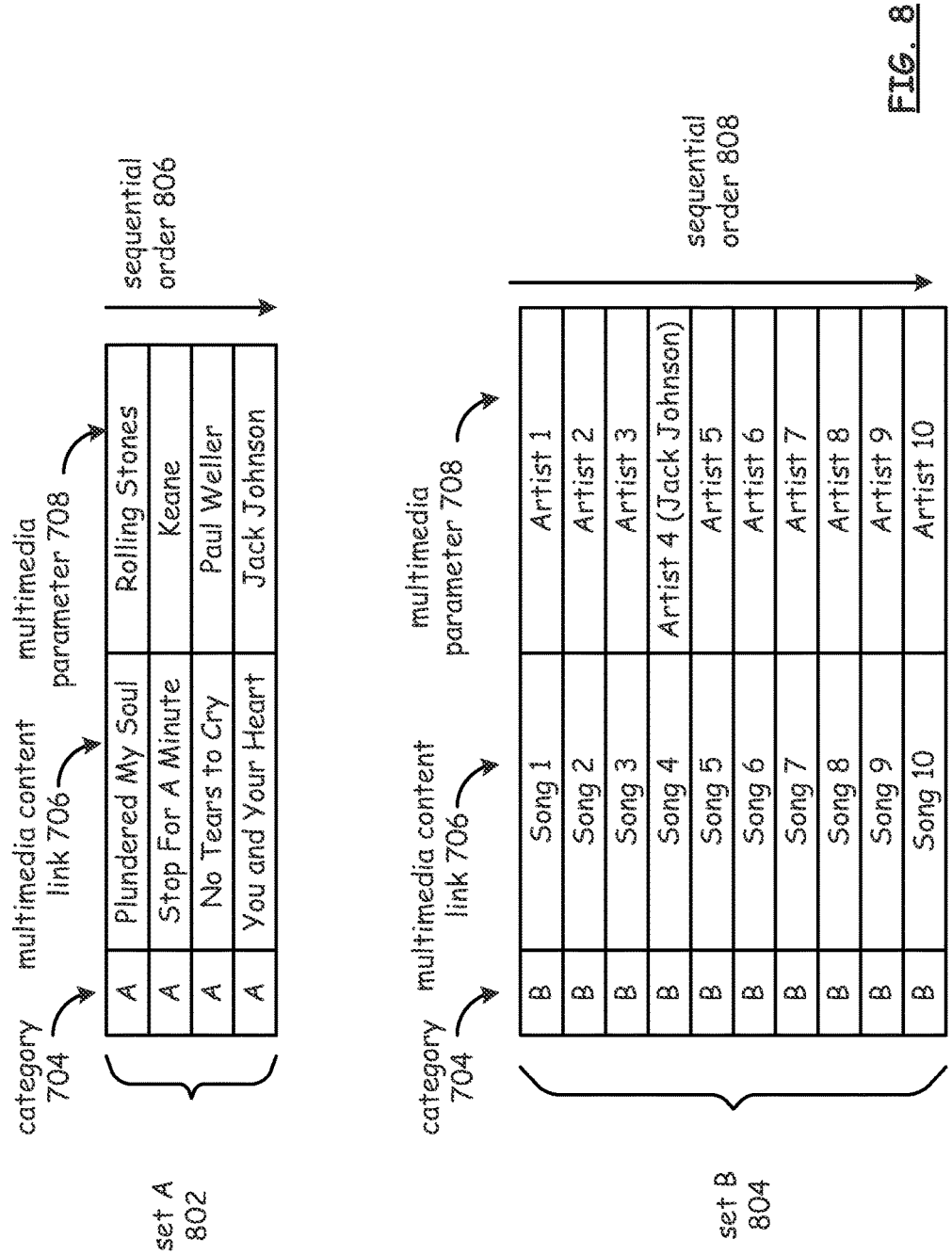

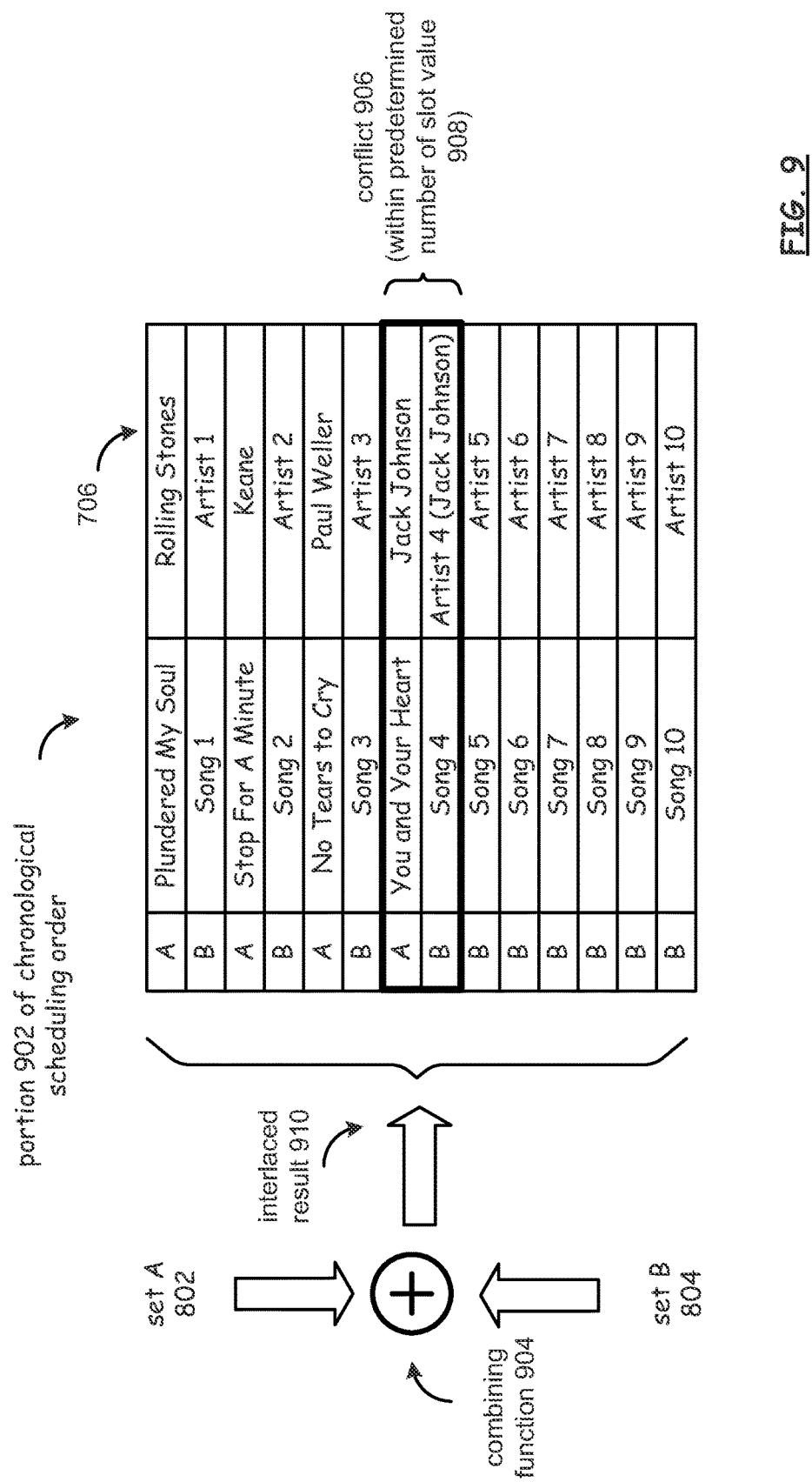

FIG. 10 modified portion 1002 of chronological scheduling order 902

| | | |
|---|---|---|
| A | Plundered My Soul | Rolling Stones |
| B | Song 1 | Artist 1 |
| A | Stop For A Minute | Keane |
| B | Song 2 | Artist 2 |
| A | No Tears to Cry | Paul Weller |
| B | Song 3 | Artist 3 |
| A | You and Your Heart | Jack Johnson |
| B | Song 5 | Artist 5 |
| B | Song 4 | Artist 4 (Jack Johnson) |
| B | Song 6 | Artist 6 |
| B | Song 7 | Artist 7 |
| B | Song 8 | Artist 8 |
| B | Song 9 | Artist 9 |
| B | Song 10 | Artist 10 | exchange 1004 (conflict resolution)

modified portion 1002

FIG. 11 modified set B 1102

| | | |
|---|---|---|
| B | Song 1 | Artist 1 |
| B | Song 2 | Artist 2 |
| B | Song 3 | Artist 3 |
| B | Song 5 | Artist 5 |
| B | Song 4 | Artist 4 (Jack Johnson) |
| B | Song 6 | Artist 6 |
| B | Song 7 | Artist 7 |
| B | Song 8 | Artist 8 |
| B | Song 9 | Artist 9 |
| B | Song 10 | Artist 10 | modified sequential order 1104 exchange 1004 modified set B 1102

MULTIMEDIA SCHEDULING FOR AIRPLAY WITH ALTERNATE CATEGORY SUPPORT

CROSS-REFERENCE TO RELATED APPLICATIONS

The present U.S. Utility patent application claims priority pursuant to 35 U.S.C. § 120 as a continuation-in-part of U.S. Utility application Ser. No. 13/850,858, entitled "METHOD AND SYSTEM FOR CONTROLLING A SCHEDULING ORDER PER CATEGORY IN A MUSIC SCHEDULING SYSTEM," filed Mar. 26, 2013, which is a continuation of U.S. Utility application Ser. No. 12/856,952, entitled "METHOD AND SYSTEM FOR CONTROLLING A SCHEDULING ORDER PER CATEGORY IN A MUSIC SCHEDULING SYSTEM," filed Aug. 16, 2010, issued as U.S. Pat. No. 8,418,182, on Apr. 9, 2013, both of which are hereby incorporated herein by reference in their entirety and made part of the present U.S. Utility patent application for all purposes.

TECHNICAL FIELD

Embodiments are generally related to the scheduling of the delivery and airplay of multimedia content. Embodiments are additionally related to airplay of audio, including music, over radio stations and networks of radio stations. Embodiments further relate to conflict resolution for multimedia content in multimedia scheduling for airplay.

BACKGROUND

Most radio stations employ a music director to select and schedule music and other multimedia programming for airplay. A typical music director is responsible for interacting with record company reps, auditioning new music, and making decisions (sometimes in conjunction with a program director) as to which songs get airplay, how much and when. At most radio stations today, the music director devises rotations for songs and programs of the daily music through specialized music software made just for this purpose.

A typical FM radio station, for example, may air a national show weekdays in a 4 pm to 5 pm slot. The content for such a show may be scheduled out of another FM radio station, typically located geographically distant from other associated radio stations. The show's content is sent to the other stations within a radio station network for hand-placement in a local GSelector database of music, audio and other multimedia content.

Music directors often have difficulty in evenly programming local rotations to prevent clashes with network programs. If the music director fails to account for the content of network programming that runs next to local programming, the listener could be exposed to repeated programming. Music directors often hand-place songs to try and prevent theses clashes between network and local programming. It is difficult, however, for a music director to adjust local program content in a way that will prevent programming clashes with the network programming later in the day yet still maintain good rotation of the local content. The music director would probably not recognize programming clashes between the local and network show in the hours long before the network show. Only as the music director approaches the network hours would the director see the programming clashes. Having to re-program much of the day's content to correct the clashing rotations is inefficient.

A possible solution to this programming clash is hand-placing content backwards in the local show, starting from the time slot of the local programming that is closest to the network programming. Once the songs for the network show have been placed into the schedule, the music director for each station could then work backwards from the beginning of that show, hand placing the local songs in high-turnover categories. These categories typically have, for example, between three and nine songs. If the music director begins song placement in the hour time slot immediately preceding the network show, the director can take into account the actual music content of the network show to maintain even rotations in the local show. Moreover, in the correction of multimedia content conflicts, such as resolving multiple instances of content with the same artist are too close to maintain even rotation. Therefore, a need exists to provide an efficient system and method for controlling a reverse scheduling order per category, while progressing in a song sequence in order, in a multimedia scheduling system.

BRIEF DESCRIPTION OF THE DRAWINGS

FIG. 4 illustrates an example of a graphically displayed table which may be utilized to configure settings for controlling a multimedia schedule, in accordance with the disclosed embodiments;

FIG. 5 illustrates an example of a graphically displayed table which may be utilized to configure settings for controlling a multimedia schedule, in accordance with the disclosed embodiments;

FIG. 6a illustrates an example of a multimedia programming rotation with evenly-spaced multimedia plays throughout a programming day, in accordance with the disclosed embodiments;

FIG. 6b illustrates an example of a graphically displayed table showing the three songs scheduled to be played in a pre-programmed countdown show, in accordance with the disclosed embodiments;

FIG. 6c illustrates an example of a graphically displayed table used for scheduling the remaining time slots throughout the day, in accordance with the disclosed embodiments;

FIG. 6d illustrates an example of a graphically displayed table used for in which a reverse scheduling method is used to solve scheduling problems, in accordance with the disclosed embodiments;

FIG. 6e illustrates an example of a graphically displayed table used for scheduling a time slot range in regular chronological order, in accordance with the disclosed embodiments;

FIG. 6f illustrates an example of a graphically displayed table used for scheduling a time slot range in reverse chronological order, in accordance with the disclosed embodiments;

FIG. 8 illustrates an example of sets of multimedia content identifiers for combining to produce a portion of a chronological scheduling order, in accordance with the disclosed embodiments;

FIG. 9 illustrates an example of combining sets to produce an interlaced scheduling result, in accordance with the disclosed embodiments;

FIG. 10 illustrates an example of a constant order strategy for conflict resolution, in accordance with the disclosed embodiments;

FIG. 11 illustrates an example of a constant order strategy for producing a modified set of multimedia in use for multimedia scheduling, in accordance with the disclosed embodiments.

DETAILED DESCRIPTION

The particular values and configurations discussed in these non-limiting examples can be varied and are cited merely to illustrate at least one embodiment and are not intended to limit the scope thereof.

The following discussion is intended to provide a brief, general description of suitable computing environments in which the system and method may be implemented. Although not required, the disclosed embodiments are generally described in the general context of computer-executable instructions, such as, for example, one or more program modules, which can be executed by a processor, computer, or a group of interconnected computers.

Figure 1:
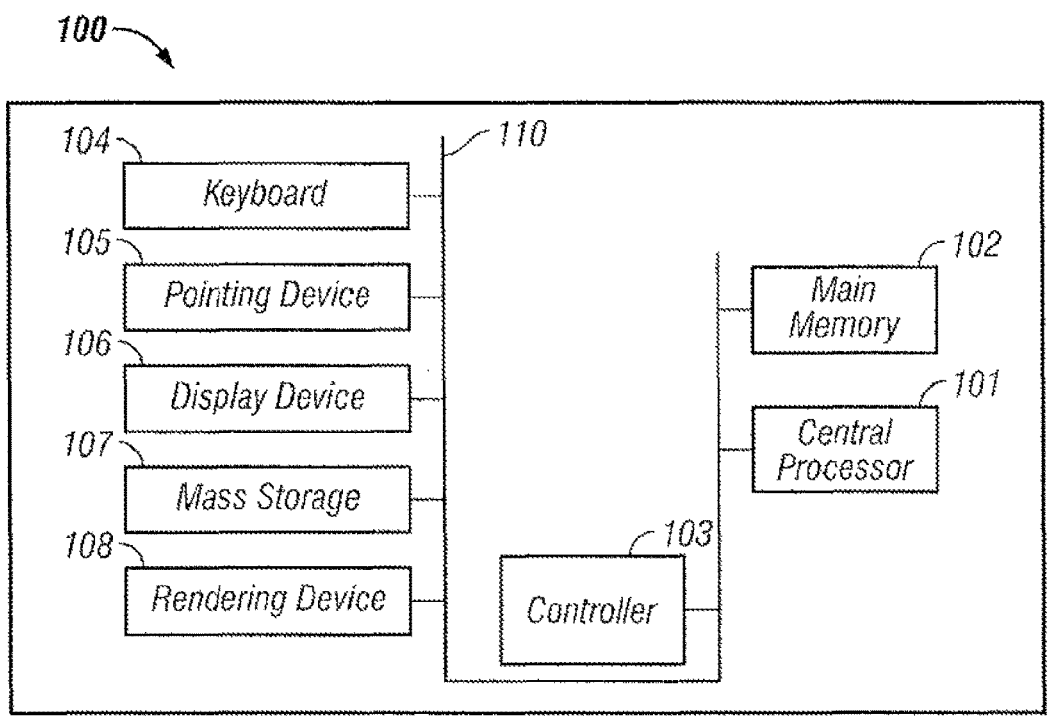
FIG. 1 illustrates a schematic view of a data-processing system, in accordance with the disclosed embodiments.
Figure 2:
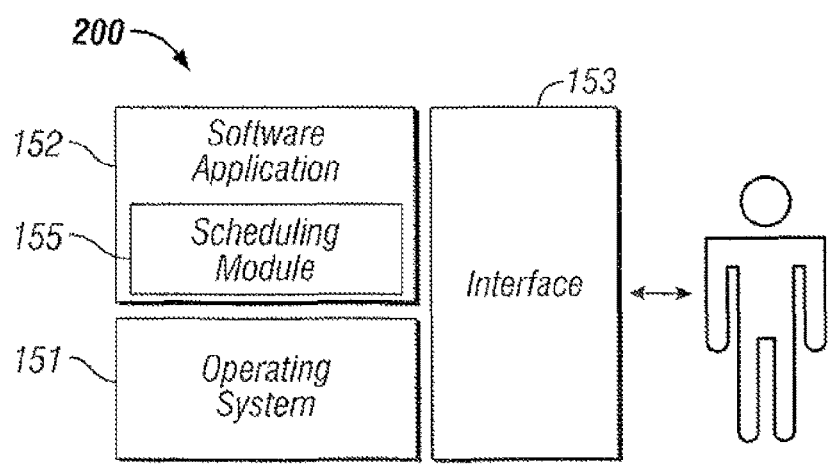
FIG. 2 illustrates a schematic view of a software system including an operating system, application software, and a user interface, in accordance with the disclosed embodiments.

FIGS. 1-2 are provided as exemplary diagrams of a data processing environment in which embodiments may be implemented. It should be appreciated that FIGS. 1-2 are only exemplary and are not intended to assert or imply any limitation with regard to the environments in which aspects or embodiments herein may be implemented.

As illustrated in FIG. 1, the disclosed embodiments may be implemented in the context of a data-processing system 100, which can be configured to include, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output components, such as a hardware interface 108, for example, may be electronically connected to the data-processing system 100 as desired. Note that such hardware interface 108 may constitute, for example, a USB (Universal Serial Bus) that allows other devices, such as printers, fax machines, scanners, copiers, and so on, to be communicated with the data-processing system 100.

Note that as illustrated, the various components of the data-processing system 100 communicate through a system bus 110 or similar architecture. It can be appreciated that the data-processing system 100 may in some embodiments, be implemented as a mobile computing device such as a Smartphone, laptop computer, iPhone™, etc. In other embodiments, data-processing system 100 may function as a desktop computer, server, and the like, depending upon design considerations.

FIG. 2 illustrates a computer software system 200 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/or application module 153.

Note that the term module as utilized herein may refer to a collection of routines and data structures that perform a particular task or implement a particular abstract data type. Modules may be composed of two parts: an interface, which lists the constants, data types, variable, and routines that can be accessed by other modules or routines, and an implementation, which is typically private (accessible only to that module) and which includes a source code that actually implements the routines in the module. The term module may also simply refer to an application, such as a computer program design to assist in the performance of a specific task, such as word processing, accounting, inventory management, music program scheduling, etc.

Generally, program modules include routines, programs, objects, components, data structures, etc., that perform particular tasks or implement particular abstract data types. Moreover, those skilled in the art will appreciate that the disclosed method and system may be practiced with other computer system configurations, such as, for example, handheld devices, multi-processor systems, microprocessor-based or programmable consumer electronics, networked PCs, minicomputers, mainframe computers, and the like.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are potential. For example, rather than a traditional "Windows" system, other operation systems, such as, for example, Linux may also be employed with respect to operating system 151 and interface 153. The software application 152 can include a scheduling module 155 that can be adapted to control scheduling with respect to the delivery and airplay of multimedia content, as described in greater detail herein. The software application 152 can also be configured to communicate with the interface 153 and various components and other modules and features as described herein. The module 155, in particular, can implement instructions for carrying out, for example, the method 300 depicted in FIG. 3 and/or additional operations as described herein.

Figure 3:
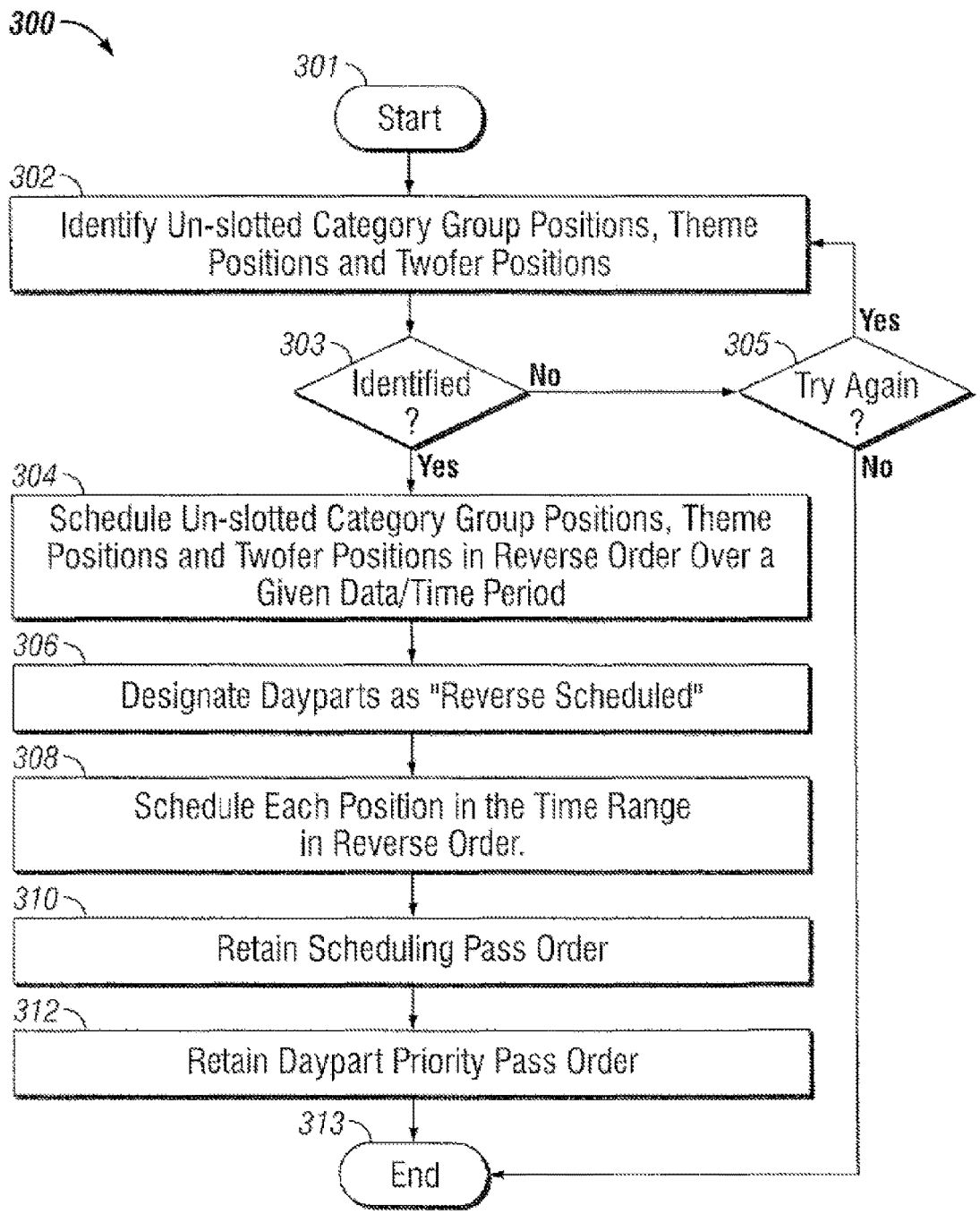
FIG. 3 illustrates a flow chart of operations depicting logical operational steps of a method for controlling a scheduling order per category, in accordance with the disclosed embodiments.

FIG. 3 illustrates a flow chart of operations depicting logical operational steps of a method 300 for controlling a scheduling order per category, in accordance with the disclosed embodiments. The method 300 offers the ability to control a scheduling order and set such a scheduling order either as a forward order per category or a reverse order per category.

As illustrated at block 301, the process for controlling a scheduling order per category can be initiated. Next, as illustrated at block 302, an operation can be processed to identify un-slotted category group positions, theme positions and twofer positions. Thereafter, a test can be performed, as illustrated at block 303, to determine if the un-slotted category group positions, theme positions, and twofer positions have all been identified. If, however, such un-slotted category group positions, theme position, and twofer positions have not been identified in block 302, then an additional test can be performed, as indicated at block 305, to determine whether or not to attempt to identify such data again. If it is determined to make another attempt at identifying such data, then the operation described at block 302 can be processed again, and so on. If, however, as indicated at block 305, it is determined not to make another attempt at identifying such data, then the process terminates, as depicted at block 313.

Assuming that such data has been identified, then unslotted category group positions, theme positions and twofer positions can be scheduled in reverse order over a given date/time period, as illustrated in block 304 Next, as illustrated at block 306, dayparts can be designated as "Reverse Scheduled". When scheduling category groups, themes or twofers designated as "Reverse Scheduled" in dayparts, designated as "Reverse Scheduled," each position in the time range can be scheduled in reverse order, as illustrated in block 308. Next, as illustrated at block 310, a scheduling pass order is retained, followed by retaining the daypart priority pass order, as illustrated in block 312. The process then terminates as illustrated in block 313.

As indicated above, the method 300 for controlling a scheduling order per category can be implemented in the context of a module or group of modules. Such modules include computer implementable instructions for performing instructions including the individual operational steps indicated in the various blocks depicted in FIG. 3. Note that various software applications and implementations may be configured to provide one or more of the instructions illustrated in FIG. 3. One possibility involves configuring a database and associated modules to designate such scheduling control. For example, a bit field may be added to a "StationDayparts" table to designate if a daypart can be reverse scheduled as follows:

```
ALTER TABLE dbo.StationDayparts ADD
    reverseSchedule bit NOT NULL CONSTRAINT
        DF_StationDayparts_reverseSchedule
    DEFAULT 0
```

Additionally, a new "Pass Order" table, which can store pass order information regarding Category Groups, Link Categories, Themes and Twofers, can be configured as follows:

```
CREATE TABLE [dbo]. [StationPassOrder] (
    [stationID] [int] NOT NULL,
    [entryTypeID] [int] NOT NULL,
    [groupID] [int] NOT NULL,
    [passOrder] [int] NOT NULL,
    [reverseSchedule] [bit] NOT NULL CONSTRAINT
[DF_StationPassOrder_reverseSchedule] DEFAULT ((0)),
CONSTRAINT [PK StationPassOrder] PRIMARY KEY CLUSTERED
(
    [stationID] ASC,
    [entryTypeID] ASC,
    [val] ASC
) WITH (PAD_INDEX = OFF, STATISTICS_NORECOMPUTE = OFF,
IGNORE_DUP_KEY = OFF, ALLOW_ROW_LOCKS = ON,
ALLOW_PAGE_LOCKS = ON) ON [PRIMARY]
) ON [PRIMARY]
```

Additionally, upgrade script can be created in order to copy pass order settings from the StationCategoryGroups table for each Category Group to a StationPassOrder table. The groupID can be to the category group id. Upgrade script can also be created in order to copy the pass order settings from the Stations table for Theme and Twofer to the StationPassOrder table. The groupID can be set to 0. The pass order columns can also be deleted for Theme and Twofer from the Stations table as follows:

```
ALTER TABLE [dbo].[Stations] DROP CONSTRAINT
    [DF_stations_twoferPassOrder]
go
ALTER TABLE [dbo].[Stations] DROP COLUMN [twoferPassOrder]
go
ALTER TABLE [dbo].[Stations] DROP CONSTRAINT
    [DF_stations_themePassOrder]
go
ALTER TABLE [dbo].[Stations] DROP COLUMN [themePassOrder]
go
```

Delete the passOrder Column from the StationCategoryGroups Table

```
ALTER TABLE dbo.StationCategoryGroups
    DROP CONSTRAINT DF_StationCategoryGroups_passOrder
GO
ALTER TABLE dbo.StationCategoryGroups
    DROP COLUMN passOrder
```

A variety of service designs can be configured in the context of constructing a method and/or system for scheduling per category. For example, a "Pass Order" may be implemented, which provides Read and/or Write techniques with respect to the "StationPassOrder" table discussed earlier. Additionally, such a "Pass Order" allows for inserting, deleting and updating entries, inserting/deleting entries for category groups as they are added/deleted in a particular radio station, and also for inserting/deleting an entry with respect to a twofer when twofers are enabled/disabled. In such a design a reverseSchedule property can be added to the CategoryGroup class in schedulerData.cs and populated as category groups are added in the context of a GetCategoryGroups2 method. Additionally, new properties can be populated in the context of a SchedulerContext with the Twofer and Theme scheduling order.

Dayparts can also be configured, which Expose the reverseSchedule property from the statondayparts table in all queries. Such "dayparts" or "DayParts" can also save the reverseSchedule property when updating the stationdayparts table. A reverseSchedule property can be added to a Daypart class in SchedulerData.cs and populate dayparts are added in the context of a GetDaypartData2 method.

Other reverse scheduling aspects may be configured, including the handling of revised properties of stations and stationdayparts table, along with the handling of a new stationpassorder table. Copy and delete station capabilities can also be configured, including the handling of revised properties of stations and stationdayparts tables, along with the handling of new "stationpassorder" tables. Additionally, a "scheduler" can be implemented, including "Next Due" aspects and an "In ScheduleDayInParallel" method.

When both daypart and category groups are 'reverse schedule' designated, a call command calcNextDaypartPlay can be implemented instead of calcPriorDaypartPlay. Additionally, local variables can be swapped prior to calling calcDueness as follows Int32 firstSongPosInDaypart and Int32 lastSongPosInDaypart. Additionally, the 'next play' can be passed to calcDueness instead of 'last play'. The operation calcDueness can also be modified to use the absolute difference between the 'current play' and the 'last play'. Regarding the "Hour" and timing, when the both daypart and category group are in a 'reverse schedule' mode, a new method (or module) may be written called calc- NextHourPlay. Other operations include calling calc-NextHourPlay instead of calcPriorHourPlay and swapping the local variables prior to calling calcDuenessInHour as follows: Int32 lastSongPosInHour and Int32 firstSongPos-InHour. Additional modifications include 'pass' the 'next play' to calcDuenessInHour instead of 'last play' and modifying calcDuenessInHour to use the absolute difference between the 'current play' and the 'last play'.

Category group positions can be provided by creating a new class OrderedDaypartSegment, derived from Daypart-Segment, which has an additional property to identify Forwards or Reverse scheduling and a list of category group ids to be scheduled as follows.

```
class OrderedDaypartSegment : DaypartSegment
{
    enum SchedulingOrder {Forward, Backward}
    List<int> categoryGroupsInSegment
}
    ■ In LinearPass method
```

A calculation of "dueness" as above can occur, which takes into account forward or reverse scheduling to ensure search depth uses correct songs. Additionally, a new list of Ordered-DaypartSegments called newDaypartSegsInTimeOrder can be populated and constructed from the DaypartSegmentS in daypartSegsInTimeOrder and each segment designated as Forwards. For the daypart in each segment in the range, if the daypart is not 'Reverse Schedule' then all the specified category group ids from the catgroupsinpass can be added to the seg.categoryGroupsInSegment. If the daypart is 'Reverse Schedule', then only the category group ids from catgroupsinpass which are not 'Reverse Schedule' are added to the seg.categoryGroupsInSegment.

Additional OrderedDaypartSegments from the same DaypartSegment can be added in daypartSegsInTimeOrder in reverse order if any of the Category Groups are designated as 'Reverse Schedule' and the underlying daypart for the segment is also designated as 'Reverse Schedule'. These can be marked as Reverse, and the category group id added to the seg.categoryGroupsInSegment. Additional operations including iterating the new list of OrderedDaypartSegment, and instead of the foreach (DaypartSegment seg in daypart-SegsInTimeOrder) the following is used: foreach (Ordered-DaypartSegment seg in newDaypartSegsInTimeOrder).

Additional instructions including ensuring that songsBy-StackingTypeAndCatGroup is only populated once per category group and {hour|daypart} by only populating in the Forwards scheduling pass. Also, operations can be implemented to determine a start position, an end position and an increment based on seg.schedOffset, seg.numPositions, seg-.schedulingOrder and then iterating over each position in the segment in the desired order instead of always doing so from the beginning to end.

If the orderedDaypartsegment scheduling order is Forwards, then an operation can be processed to iterate over the schedule positions from beginning to end and continue to unschedule the planned songs as before. If the orderedDaypartsegment scheduling order is "Reverse," then an operation is implemented to iterate over the schedule positions from the end to the beginning, with no unscheduled planned songs.

When identifying if the position to schedule is in the correct category group for the current pass, instead of:

```
if (se.entrytype == EntryType.Song
    && se.status == Status.Unscheduled
    && catgroupsinpass.Contains(se.catgrpid))
```

An operation can be implemented to ensure that the category group is valid for the current orderedDaypartsegment by evaluating the seg.categoryGroupsInSegment instead of catgroupsinpass. Regarding Artist Block Positions, the "Reverse Scheduled" setting can be obtained for Twofers from SchedulerContext. Additionally, a "lookupSchedule-dArtistBlocks" method can be modified to yield a list of artist block positions based on the reverse schedule setting of unscheduled artist blocks and each daypart in the time range.

Regarding "Twofer Positions," an operation can be processed to obtain the "Reverse Scheduled" setting for Twofers from SchedulerContext. The "lookupScheduledTwofers" method can be modified to yield a list of twofer positions based on the reverse schedule setting of unscheduled twofers and each daypart in the time range.

Regarding "Theme Positions," an operation can be processed to obtain the 'Reverse Scheduled' setting for Theme from SchedulerContext. A new list of OrderedDaypartSegments can be populated, which is called newDaypartSegsIn-TimeOrder and constructed from the DaypartSegments in daypartSegsInTimeOrder. The "schedulingOrder" can be then designated as Forwards or Reverse where applicable. Additional operations include iterating over the newDaypartSegsInTimeOrder. If the OrderedDaypartSegment scheduling order is Forwards, then iteration may take place over the schedule positions from beginning to end. If the OrderedDaypartSegment scheduling order is Reverse, then iteration can take place over the schedule positions from the end to the beginning.

In configuring a method and/or system for controlling a scheduling order, as discussed herein, policy information and conditions may be configured. For example, an operation may be implemented to update Policy Schema to handle revised properties of stations and a "stationdayparts" table and a new "stationpassorder" table. New and/or charged data can be propagated in "policy" XML and the "Pass Order" discussed herein can have a dependency on category groups.

Other potential design aspects including modifying the Pass Order by exposing the 'Reverse Schedule' property in a pass order dialog, along with pulling the pass order data when opening the pass order dialog, and merging with the pass order information for the category groups, theme and twofer rows. Additional design aspects include preventing slotted categories from being "reverse scheduled" and persisting new pass order data when category data is saved. Regarding "dayparts," the "Reverse Schedule" property can be exposed when adding, viewing and/or editing a daypart. Further design aspects including allowing for editing of the 'Reverse Scheduling' property in an Add/Edit daypart dialog only.

Note that as utilized herein the term "dialog" refers to a "dialog box," which is a special feature or window utilized in the context of a GUI (Graphical User Interface), such as, for example, the interface 153 of FIG. 2, to display information to a user, or to obtain a response, if required. A "dialog" refers to a dialog between a data-processing system, such as that described herein with respect to FIGS. 1-2 and the user. The data-processing system informs the user of something, requests input from the user, or both. Such a dialog or dialog box provides controls that allow a user to specify how to carry out a particular action.

FIG. 4 illustrates an example of a graphically displayed table 400, which may be utilized to configure settings for controlling a multimedia schedule, in accordance with the disclosed embodiments. It can be appreciated that the table 400 can be displayed in the context of a GUI, such as the interface 153 of FIG. 2 for display on a display such as, for example, the display device 106 of FIG. 1. Category group options can be set using table 400. A user can interact with the table 400 to designate, for example, the "Pass Order" with respect to column 402 shown in FIG. 4. Column 404 allows a user to set "Group" options such as designating an "A" or "B" group or a <Theme> or <Twofer>. Column 406 allows a user to set "Reverse Schedule" options, while a particular slot may be set using controls within column 408. Additionally, timing options can be set using controls under column 410, and stacking options set using controls under column 412. Depth (percentage) can be set using controls associated with column 414. Finally, research data can be designated using data entered underneath column 416.

FIG. 5 illustrates an example of a graphically displayed table 500, which may be utilized to configure settings for controlling a multimedia schedule, in accordance with the disclosed embodiments. Table 500, in association with table 400, provide a number of options. The most notable option for selection in FIG. 5 is the ability to designate "Dayparts" data and settings, as indicated by the controls associated with the graphically displayed tab 503.

In an embodiment, an efficient multimedia scheduling technique intends to optimize the rotation of smaller categories containing multimedia that also appear in pre-scheduled special programming. In a pre-programmed countdown show that airs at 7:00 p.m., for example, songs may be featured that also play in a normally scheduled category. Typically, songs featured in a countdown show are pre-scheduled before the scheduler, or scheduling module of a computer-implemented device, schedules the programming for the preceding time slots. This can lead to compromised rotations of those songs as the scheduler attempts to work around the rotation problem.

FIG. 6a illustrates an example of a multimedia programming rotation with evenly-spaced plays throughout a programming day. Each column illustrates the programming rotation of three songs out of a rotation of five songs (each song numbered 1 through 5) per hour-long time slot, beginning with 12:00 midnight 601 and ending with 7:00 p.m. 620. The top row 630 shows the day's particular time slot, beginning with 12:00 midnight and ending with 7:00 p.m. and the bottom row 640 shows the three particular songs out of five total songs in a category chosen for that particular time slot. FIG. 6a illustrates how five songs in a single category would be equally rotated with three clock requests each hour for that category. In the 12:00 midnight time slot 601, for example, songs 1-2-3 are scheduled 641 to air. In the next time slot 602, songs 4-5-1 are scheduled 642 to air. The song pattern of 1-2-3-4-5 repeats until the scheduling pattern ceases following the 6:00 p.m. hour 619, or just before for the pre-programmed show at 7:00 p.m. 620. As an ideal rotation, the five songs in a single category are equally spread and get even play in the program throughout the day, beginning at 12:00 midnight 601 and ending at 6:00 p.m. 619, before the start of the 7:00 pm. countdown show.

This ideal rotation, however, can be interrupted depending on the songs scheduled to air during the pre-programmed countdown show. FIG. 6b illustrates the three songs scheduled 660 to be played in the 7:00 time slot 620 during a pre-programmed countdown show. Songs 2-1-5 are pre-programmed 660 in this order into the schedule during the 7:00 p.m. time slot 620.

In FIG. 6c, with the countdown show songs (2-1-5) in the 7:00 p.m. time slot 612, the remaining time slots throughout the day are scheduled 665. The five songs, however, are not evenly-spread throughout the day's programming when manual scheduling begins at the beginning of the day at the 12:00 midnight time slot 601 when the 7:00 p.m. time slot 660 is already pre-programmed. In the 6:00 p.m. time slot 619, songs 2-1-5 would be ideal choices based on the previous time slot's schedule, as illustrated in 659 in FIG. 6a. But, songs 2-1-5 have already been scheduled 660 for the 7:00 p.m. countdown show. The scheduler has to make serious compromises to the rotational pattern, thus having to settle with songs 1-2-4 669 in the 6:00 p.m. time slot 619. Scheduling songs 1-2-4 669 in the 6:00 p.m. time slot 619 results in songs 2 and 4 having poor spread due to their play in the previous 5:00 p.m. time slot 618. There are very few ways to resolve the scheduling problem when the countdown show is pre-programmed and the rest of the day's programming is set starting at the beginning of the day.

Figures 6E, 6F:
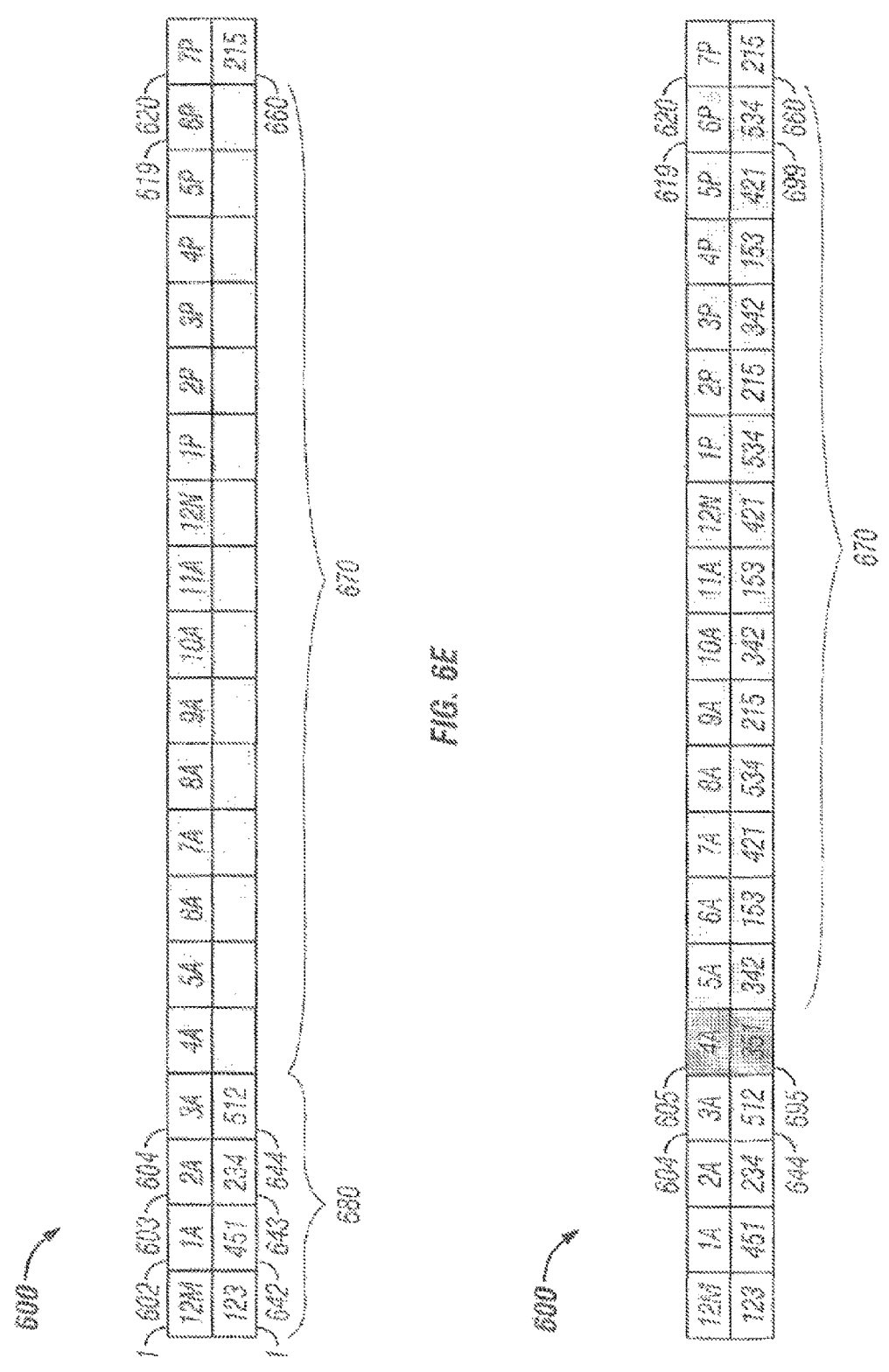

FIG. 6d illustrates a time slot range 670 in which a reverse scheduling method 600 is used to solve scheduling problems as described in FIGS. 6a-6c. Reverse scheduling, as illustrated in FIG. 6d works by scheduling a day's programming from the reverse direction, starting immediately before the pre-programmed show. The scheduler provides a time slot range 670 in which day's programming is to be scheduled in reverse chronological order, preventing rotation problems with pre-scheduled programming. For example, in FIG. 6e, the countdown show is again scheduled at 7:00 p.m. 620, with songs 2-1-5 pre-programmed 660. The time slot range 680 from 12:00 midnight 601 to 3:00 a.m. 604 is scheduled in regular chronological order, as shown in FIG. 6e, as this range is an off-peak time slot range.

In FIG. 6f, the time slot range from 5:00 a.m. 605 to 6:00 p.m. 619 is scheduled in reverse chorological order to prevent rotation problems between the countdown show in the 7:00 p.m. time slot and the time slots immediately preceding the show. The scheduler or a computer-implemented scheduling module starts at 6:00 p.m. 619 and looks both ahead in time and behind in time to make the best scheduling choices. When starting with the 6:00 p.m. hour 619, the scheduler finds that songs 2-1-5 660 are closest to the songs in the pre-scheduled countdown show in the 7:00 p.m. time slot 620. The scheduler then avoids scheduling this song combination of 2-1-5 in the 6:00 p.m. time slot. Because one song out of this three song combination must be used in the 6:00 p.m. time slot 619, the scheduler module chooses song 5 to schedule in the 6:00 p.m. time slot, in the farthest position from the rotation in the 7:00 p.m. time slot. Scheduling song 5 in the first position in the 6:00 p.m. time slot provides the most separation from the song 5's play in the pre-scheduled 7:00 p.m. time slot.

Looking back in time, the scheduler sees that songs 3 and 4 are played, in that order, in the 2:00 a.m. time slot. To keep songs 3 and 4 as separate as possible for a proper rotation, the scheduler places songs 3 and 4, in that order, in the remaining two positions in the 6:00 p.m. time slot. The final order of songs in the 6:00 p.m. time slot 619 is 5-3-4 699. The scheduler then works in reverse chronological order from the 6:00 p.m. time slot 619, essentially repeating the established pattern to schedule the remaining time slots and prevent scheduling problems with pre-programmed show at 7:00 p.m. 620.

The reverse scheduling method 600 disclosed herein allows a scheduler to prevent scheduling problems during peak rotation hours, by burying rotational compromises in off-peak hours. In FIG. 6*f*, for example, following performance of the reverse scheduling method 600, the established scheduling pattern must be broken in the 4:00 a.m. time slot 605 because of scheduling conflicts in the 3:00 a.m. time slot. Following the reverse chronological scheduling pattern, the 4 a.m. time slot 605 should be programmed with songs 2-1-5, in that order. In the 3:00 a.m. time slot 604, however, songs 5-1-2 are already scheduled 644 in that order. The scheduler must compromise the rotation schedule in the off-peak 4:00 a.m. time slot, and schedule songs 3-5-1 695 instead. However, there are fewer listeners in this hour as compared to the 6:00 p.m. time slot. By properly constructing a reverse scheduling region, the user can now "bury" the scheduling compromise at a time where any negative impact on the rotation will affect far fewer listeners than the number who would have been affected by poor rotation in the 6:00 p.m. time slot.

Referring now to FIGS. 7 through 12, the embodiment discussed herein relates to resolving conflicts of multimedia items in discrete dayparts, or portions, of a chronological scheduling order while sustaining constant order, or near constant order, of the slots for airplay of such media. An example of a chronological scheduling order is such as that generated under the apparatus and methods of the reverse scheduling method 600 discussed in detail with reference to FIGS. 1 through 6 above, for example.

With respect to the establishment of a chronological scheduling order for a day period, further scalability is required with regard to discrete portions of the scheduling order. For example, individual dayparts of a 24-hour period may include further conflicts, based on the principle that audience members listen or view media content in discrete blocks, such as in 20-minute or 40-minute increment increments. Market studies serve to compile trend information for different demographic regions, and also to mark changes in media consumption habits.

A principle goal of a programming director, or a music director, is to increase the time listening/viewing, and in effect increasing the size of an audience targeted by advertisers. Such increases are effected by satisfying the consumption needs of the listener/viewer audience.

Generally, a consideration that a program or music director takes into consideration is audience flow control. For example, assuming that audience members are receptive to a station's content, audience flow control relates to a next multimedia content in a sequence that may capture the attention of the audience members of a previous multimedia content and/or program. Under audience flow, one goal is to maximize, or control, the number of audience members that flow through to a next selection of a slot, and correspondingly, minimize the number that flow away to competing multimedia channels.

Content selection for a chronological scheduling order is viewed as the majority of the programming activity leading to audience flow control. With content selection, such as that provided by generating a chronological scheduling order under the apparatus and methods of the reverse scheduling method 600, a next step in the process may be the scheduling of the multimedia content that maximizes the likelihood of their being consumed by the desired, or target, audience and to retain the attention of the target audience.

The data processing system 100 (see FIG. 1), that may be directed by the computer software system 200 (see FIG. 2), may operate to provide a mix, or interlacing, of categories of multimedia to provide variation, which is structured to retain audience. Consistency in the variation, including category selections, and proportions of the categories used in the discrete portions, may provide increased control of audience flow, and advertisement value.

The result sought, then, is a high degree of overall preference and familiarity of the station for an audience member, but with lower-rotation noncurrents giving the station a feeling of good variety, low repetition, and depth of library.

In the context of broadcast radio as an example, by having a consistent balance of music, a subliminal pattern may form, which an audience member will grow to understand and expect, thereby assisting in the promotion of both tune-in and repeat or extended listening.

To extend listening spans and to help manage the audience flow, the data-processing system (see FIG. 1), based upon ratings research, operates based upon the computer software system 200, to increase or maximize variety and while also providing for airplay a balanced chronological scheduling order that constantly represents a favorable listening format in a short amount of time. That is, to reward an audience member for choosing a station's channel, and fulfill an audience member's expectations as soon as possible.

In generating categories for use in the data-processing system 100 (FIG. 1), audience members should sense a difference between the main music categories, and categories should also be based upon the viewpoint and/or expectations of the target audience member. An example of the number of multimedia categories for music multimedia, which may be metered from the top of the hour of a scheduling order, are:

Category A—power currents: top songs

Category B—secondary currents: new songs increasing and/or familiar songs decreasing Category C—power classics: top testing, very familiar, popular songs; and Category D—secondary classics: well tested, familiar, additional songs.

As may be appreciated by one of ordinary skill in the art, categories may be subdivided. For example, power classics (category C) and secondary classics (category D) classics may be subdivided into subcategories (levels 1, 2 and 3) to further aid in rotating gold songs, recent classics and recurrences evenly, to promote balance between different genres of music.

An aspect of programming multimedia content for at least a portion of a chronological scheduling order is for spreading out the content and rotation to cause the media to stay out of sync, and unpredictable to prospective audience members. For the program and/or music director, adjustments to the schedule order is sought, while still slotting the multimedia in the original order as possible—in other words, to sustain a constant order without losing airplay for a multimedia content skipped due to a programming conflict (such as a category B song by an artist that the system schedules too close to a category A song by that same artist).

Figure 7:
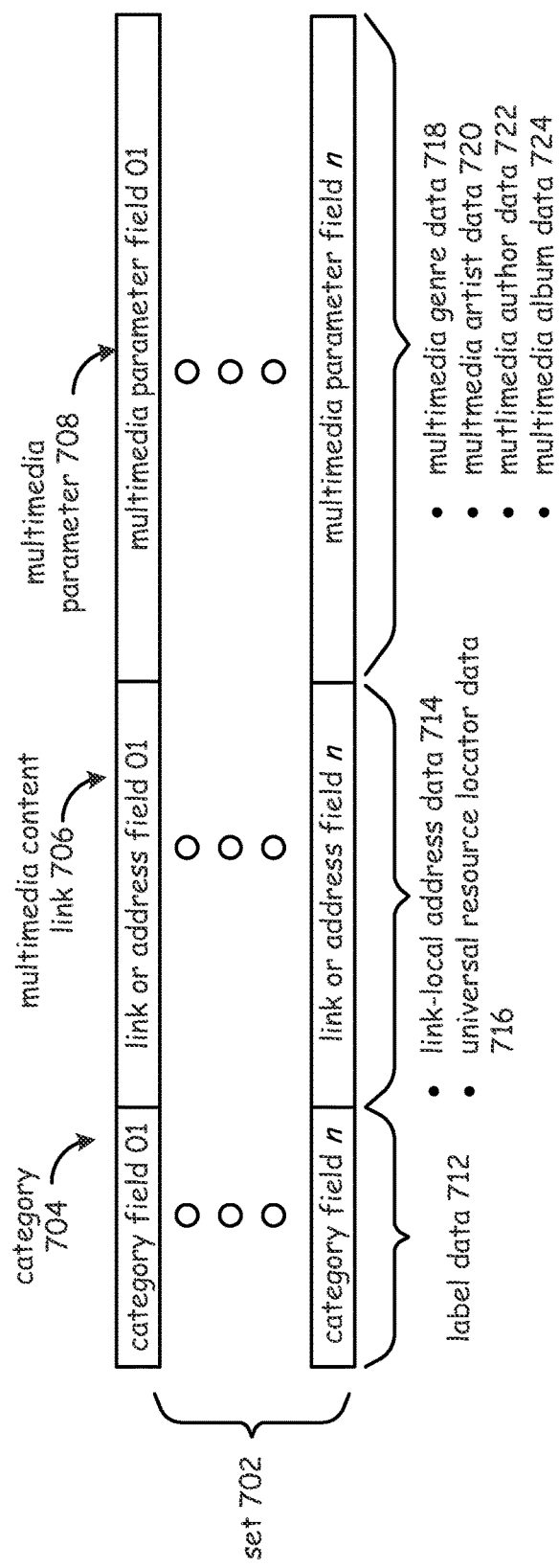
FIG. 7 illustrates an example of a multimedia content identifier format for use in conflict resolution of multimedia scheduling using constant order, in accordance with the disclosed embodiments.

Referring to FIG. 7, illustrates a multimedia content identifier 700 format for use in the constant order conflict resolution of the present embodiment. A plurality of multimedia content identifiers 700 may provide a set 702 for a category, having a size from 01 to n. Each of the multimedia content identifiers includes a category 704 stored by category field 01, a multimedia content link 706 stored by link or address field 01, and a multimedia parameter 708 stored by multimedia parameter field 01. In some embodiments, some or all of the fields illustrated in FIG. 7 can be included as part of an Internet Protocol (IP) address packet, or in a payload packet associated with a stream of data.

The category field n includes label data 712, which may be designated as category "A" for power current multimedia (such as top songs), category "B" for secondary current multimedia (such as new songs increasing in popularity, and/or familiar songs decreasing in popularity), category "C" for power classic multimedia, etc.

The link or address field n includes memory data sources for the multimedia, which may be local or centrally situated to the data-processing system 100 (FIG. 1), or may be accessible remotely or as distributed storage (for example, as cloud computing via indirect coupling via a local area network and/or a wide area network). For example, the link or address filed may include link-local address data 714 for local data memory storage and/or universal resource locator (URL) data 716 for remote or distributed data memory storage.

The multimedia parameter field n includes data regarding properties of the multimedia content. For example, with music, the data may include multimedia genre data 718, multimedia artist data 720, multimedia author (or writer) data 722, or multimedia album data 724. Such information may be used to provide greater variety within a portion of a chronological scheduling order, as discussed in detail with reference to FIGS. 8-12.

FIG. 8 illustrates an example of sets 802 and 804 of multimedia content identifiers. In this example, the sets relate to multimedia programming for radio broadcast airplay. As may be appreciated by one of ordinary skill in the art, the multimedia programming may also pertain to audio, music, video, or a combination thereof.

Set A 802 has a category 704 of "A," relating to power current or top songs, with multimedia content links 706 identified by song titles for clarity. As understood, the links 706 include data identifying the location of the multimedia content source, which may be accessed locally, remotely, and/or distributed, as may be indicated by the address. Multimedia parameter 708 relates to the artist for the song. Set A 802 has a sequential order 806 generated by the data-processing system 100, as may be directed by the computer software system 200 (see FIGS. 1 and 2).

Set B 804 has a category 704 of "B," relating to secondary currents: new songs increasing/familiar songs decreasing, with multimedia content links 706 identified by song titles for clarity. As understood, the links 706 include data identifying the location of the multimedia content source, which may be accessed locally, remotely, and/or distributed, as may be indicated by the address. In the present example, multimedia parameter 708 relates to the artist for the song. Set A 802 has a sequential order 808 generated by the data-processing system 100, as may be directed by the computer software system 200 (see FIGS. 1 and 2).

The number of multimedia items represented by each of the sets reflects audience control strategies based on multimedia content selection and variety. That is, for example, audience members want to hear the songs they like with some frequency—too seldom, the audience members will not come across them enough to expect them again. This discourages repeat and long-span listening by an audience member. On the other hand, when favorite songs are aired too often, the effect may be received as overly-repetitive, causing an audience member to tune out too quickly, and shortening listening spans.

In the present example of FIG. 8, the "A" category content amounts to four songs; the "B" category content to 10 songs. The relative amounts of content, for example percentages of content, may be based upon a study, as well as considering cost per song (e.g., licensing fees, etc).

FIG. 9 illustrates an example of combining sets 802 and 804 via a combining function 904 to produce an interlaced result 910, via the data-processing system 100 (see FIG. 1). As shown in the present example, the combining 904 function mixes or interlaces set A 802 and set B 804 to produce the interlaced result 910, which is the portion 902 of a chronological scheduling order. As noted, the portion 902 may be timed to correspond to the average tune-in period of an average audience member, which may be gauged by survey and consumer studies.

Although the combining function 904 is illustrated in FIG. 9 as a "+" symbol, the combining function 904 may be based upon various algorithms, which are executed by the data-processing system 100 (see FIG. 1). For example, the combining may be on a random basis, a partially-random basis (such as being front-loaded towards the beginning of the portion 902), an algorithm based on consumer surveys and/or studies, etc. The algorithm may also take into account other business rules, or state or federal statutes and laws.

In the present example of FIG. 9, the portion 902 illustrates a conflict 906 bordered in bold lines. The conflict 906 is with respect to the song "You and Your Heart" of the A category, and Song 4 of the B category. The conflict 906 is based upon the respective multimedia parameter 708 for each of the songs. In this example, each song in the overall chronological scheduling order is performed by the same artist within a predetermined number of a slot value 908, such as within one-slot of each other (or adjacent slots). In this context, the slot value 908 may also be referred to as a "minimum artist separation."

As may be appreciated, the predetermined number of slot value 908 may designate spacing for identifying a conflict 906, based upon the degree of variation desired. For example, a predetermined number of slot value 908 being "2," the conflict with the category B song 4 would be resolved with another category B song at least two slots before or after song 4. In this example, a suitable exchange would be with "Song 6" of the category B set having "Artist 6."

To increase variation, and avoid perception of repetition, a constant order process may be used to resolve the conflict via the data-processing system 100. Under constant order, the conflict is resolved by exchanging the B category "Song 4" with a preceding B category song or a following B category song.

FIG. 10 illustrates an example of a constant order strategy for a modified portion 1002 of the chronological scheduling order 902, via the data-processing system 100 (see FIG. 1). The modified portion 1002 engages in an exchange or conflict resolution 1004 to exchange Song 5 of category B with Song 4 of category B such that Song 5 precedes Song 4 in airplay.

Note that the preceding Song 3 would not be suitable for exchange 1004 because the conflict would remain between Song 4 of category B with the artist "Jack Johnson," and the category A song "You and Your Heart," with the artist "Jack Johnson".

FIG. 11 illustrates an example of a constant order strategy for a modified set B 1102, via the data-processing system 100 (see FIG. 1). The modified set B 1102 provides another aspect of constant order by carrying forward the order of the exchange 1004 with a modified sequential order 1104, without omitting the multimedia that otherwise may be skipped to resolve a conflict.

That is, when set B of the example is selected for subsequent use, the order of Song 5 and Song 4 remain exchanged as modified sequential order 1104. Otherwise, if set B remains unchanged (see set B 804 of FIG. 8), the Song 4 would have less airtime (i.e., starvation) because it would have been skipped over to avoid or resolve the conflict 906. In other words, by skipping song 4 to avoid the conflict 906, another sequential cycle of Set B 804 would have to occur for "Song 4" to have airplay.

Also, by not skipping the multimedia entry, the allotted content time stays intact, without the need to provide a corresponding, suitable replacement for the allotted multimedia content entry.

Figure 12:
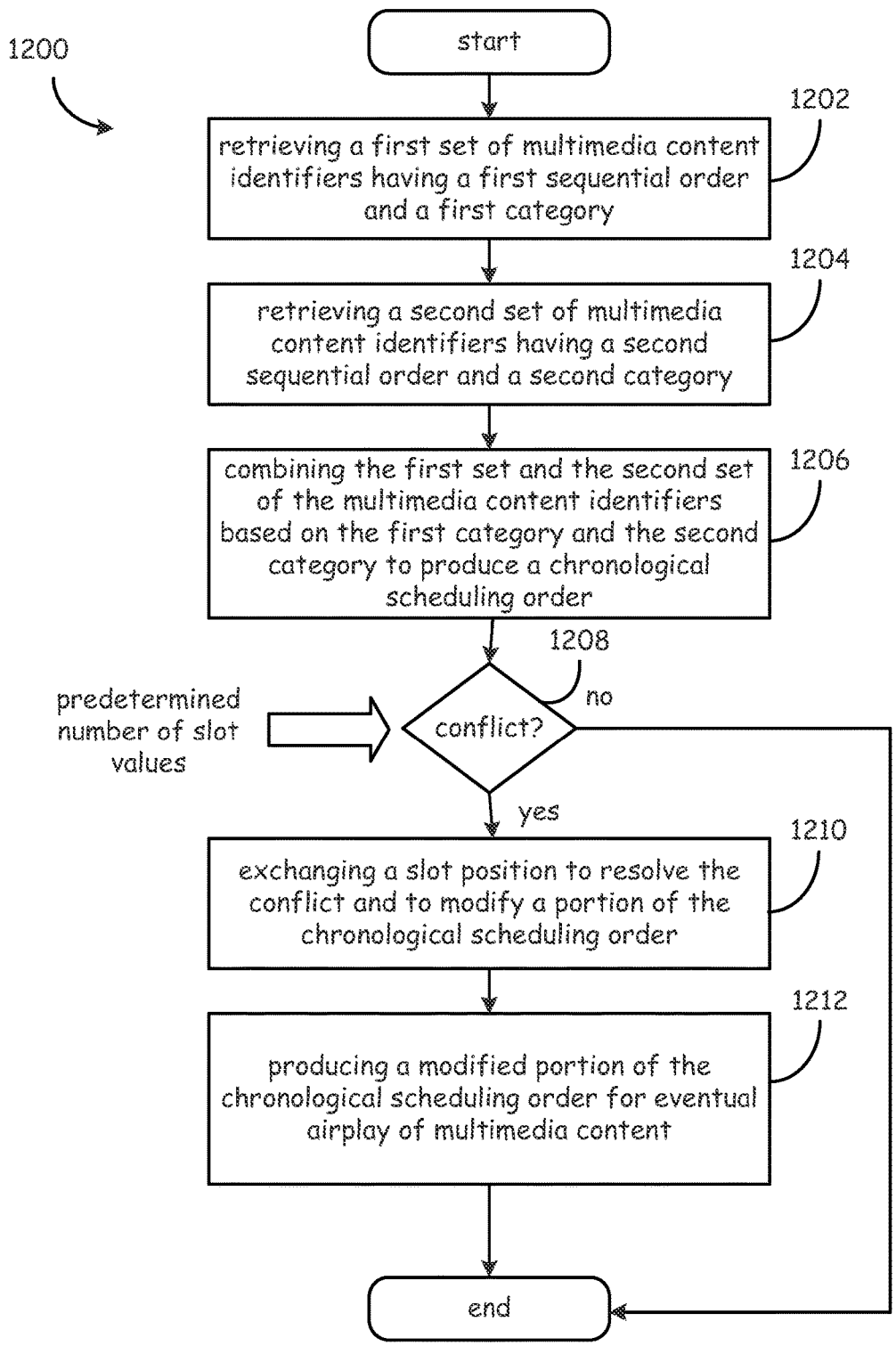
FIG. 12 illustrates a flow chart of operations depicting logical operational steps of a method for employing constant order for multimedia conflict resolution, in accordance with the disclosed embodiments.

FIG. 12 illustrates a flow chart of operations depicting logical operational steps of a method 1200 for employing constant order to a portion of a chronological scheduling order, via the data-processing system 100 of FIG. 1.

At block 1202, the method for providing constant order for conflict resolution begins with retrieving a first set of multimedia content identifiers having a first sequential order and a first category. Each of the first set of multimedia content identifiers includes at least one multimedia parameter. At block 1204, the method 1200 continues by retrieving a second set of multimedia content identifiers having a second sequential order and a second category. Each of the second set of multimedia content identifiers includes at least one multimedia parameter.

The at least one multimedia parameter may include multimedia genre data, multimedia artist data, multimedia author data, multimedia album data, or other multimedia data.

Upon retrieval, the method at block 1206 combines the first set and the second set of the multimedia content identifiers based on the first category and the second category, which in the present example are category A for power currents (or top songs) and category B for secondary currents (new songs increasing in popularity and/or familiar songs decreasing in popularity). The block 1206 continues by producing at least a portion of a chronological scheduling order having a plurality of slot positions. The combining, or interlacing, of the first set, such as a category set A, and the second set, such as a category set B, may be based on a random basis, a pseudo-random basis, and/or an algorithm based on market survey information, including feedback, relating to a target audience demographic.

At block 1208, when a conflict occurs with at least one multimedia parameter of one of the first set of the multimedia content identifiers and the at least one multimedia parameter of one of the second set of the multimedia content identifiers, the method or system may use constant order to resolve the conflict. In the example provided, a conflict may arise when the multimedia parameter of the first set and the second set have substantially equivalent data values, such as artist name, within a predetermined number of slot value. For errors to occur in adjacent slots, a value of "1" would suffice for detection and correction of the conflict under use of "constant order." As may be appreciated, greater values may provided as to the predetermined number of slot value to increase a variety span in the modified portion of the scheduled chronological scheduling order.

The method at block 1210 resolves the conflict by exchanging a slot position of either of the one of the first set and the one of the second set with another corresponding one of either of the first set and the second set of the multimedia content identifiers based upon a predetermined number of slot value to resolve the conflict and to modify the at least the portion of the chronological scheduling order. With the conflict resolved, the method continues at block 1212 by producing a modified portion of the chronological scheduling order for eventual airplay of multimedia content corresponding to the multimedia content identifiers.

As another aspect of constant order, the method 1200 may modify the first sequential order or the second sequential order of either a first set or a second set based on exchanging the position of either the first set or the second set of the multimedia content identifiers. For example, the modification of the portion of the chronological scheduling order may be carried over to the sequential order of either the first set or the second set. Doing so avoids "starvation" of a song, or multimedia content that is skipped to resolve the conflict, and more time passes until it is subsequently played.

As indicated above, the method 1200 for providing constant order to conflict resolution can be implemented in the context of a module or group of modules. Such modules include computer implementable instructions executable by the data-processing system 100 of FIG. 1 for performing instructions including the individual operational steps indicated in the various blocks depicted in FIG. 12. Note that various software applications and implementations may be configured to provide one or more of the instructions illustrated in FIG. 12.

As may also be used herein, the terms "processing module," "processing circuit," "processing circuitry," "processing unit" and/or "processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be "distributedly" located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may also be used herein, the term(s) "configured to", "operably coupled to", "coupled to", and/or "coupling"

includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

It will be appreciated that variations of the above-disclosed and other features and functions, or alternatives thereof, can be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for multimedia content airplay by a computing device, the method comprising:
   retrieving a first set of multimedia content identifiers having a first sequential order and a first category, wherein each of the first set of multimedia content identifiers includes at least one multimedia parameter;
   retrieving a second set of multimedia content identifiers having a second sequential order and a second category, wherein each of the second set of multimedia content identifiers includes at least one multimedia parameter, wherein a ratio of the number of multimedia content identifiers in the first set to the number of multimedia content identifiers in the second set is based on licensing fees of the multimedia content;
   combining the first set and the second set of the multimedia content identifiers based on the first category and the second category to produce at least a portion of a chronological scheduling order having a plurality of slot positions;
   when a conflict occurs with the at least one multimedia parameter of one of the first set of the multimedia content identifiers and the at least one multimedia parameter of one of the second set of the multimedia content identifiers by having equivalent data values within a predetermined number of slot values of the at least the portion of the chronological scheduling order:
     producing a modified chronological scheduling order by exchanging a slot position of either of the one of the first set and the one of the second set of the multimedia content identifiers with another corresponding one of the either of the first set and the second set of the multimedia content identifiers based upon the predetermined number of slot values to resolve the conflict;
   scheduling the multimedia content based on the modified chronological scheduling order; and
   airplaying the multimedia content.

2. The method of claim 1, wherein the at least one multimedia parameter comprises at least one of:
   multimedia genre data;
   multimedia artist data;
   multimedia author data; and
   multimedia album data.

3. The method of claim 1 further comprising:
   modifying the first sequential order or the second sequential order of either of the first set and the second set by exchanging the position of either of the one of the first set and the second set of the multimedia content identifiers.

4. The method of claim 1, wherein the combining the first set and the second set of the multimedia content identifiers on a scheduling order further comprises:
   combining the first set and the second set of the multimedia identifiers on an interlacing basis.

5. The method of claim 4, wherein the interlacing basis is random.

6. The method of claim 4, wherein the interlacing basis is based upon an algorithm using feedback of a target audience of the multimedia content.

7. The method of claim 1, wherein the first category is a power currents category including top charted multimedia and the second category is a secondary currents category including either newly released multimedia increasing in popularity or familiar multimedia decreasing in popularity.

8. A computing device for multimedia content airplay, the computing device comprising:
   a processor;
   a data bus coupled to the processor; and
   a non-transitory computer-usable medium embodying computer code, the computer code including a program of instructions executable by the processor and configured for:
   retrieving a first set of multimedia content identifiers having a first sequential order and a first category, wherein each of the first set of multimedia content identifiers includes at least one multimedia parameter, wherein a ratio of the number of multimedia content identifiers in the first set to the number of multimedia content identifiers in the second set is based on licensing fees of the multimedia content;

retrieving a second set of multimedia content identifiers having a second sequential order and a second category, wherein each of the second set of multimedia content identifiers includes at least one multimedia parameter;

combining the first set and the second set of the multimedia content identifiers on a scheduling order based on the first category and the second category to produce at least a portion of a chronological scheduling order;

when a conflict occurs with the at least one multimedia parameter of one of the first set of the multimedia content identifiers and the at least one multimedia parameter of one of the second set of the multimedia content identifiers by having equivalent data values within a predetermined number of slot values of the at least the portion of the chronological scheduling order:

producing a modified chronological scheduling order by exchanging a position of either of the one of the first set and the one of the second set of the multimedia content identifiers with another corresponding one of the either of the first set and the second set of the multimedia content identifiers based upon the predetermined number of slot values to resolve the conflict;

scheduling the multimedia content based on the modified chronological scheduling order; and airplaying the multimedia content.

9. The computer-based device of claim 8, wherein the at least one multimedia parameter comprises at least one of:
a multimedia genre data;
a multimedia artist data;
a multimedia author data; and
a multimedia album data.

10. The computer-based device of claim 8, wherein the program of instructions further configured for:
modifying the first sequential order or the second sequential order of either of the first set and the second set by exchanging the position of either of the one of the first set and the second set of the multimedia content identifiers.

11. The computer-based device of claim 8, wherein the combining the first set and the second set of the multimedia content identifiers on a scheduling order further comprises:
combining the first set and the second set of the multimedia identifiers on an interlacing basis.

12. The computer-based device of claim 11, wherein the interlacing basis is random.

13. The computer-based device of claim 11, wherein the interlacing basis is based upon an algorithm using feedback of a target audience of the multimedia content.

14. The computer-based device of claim 8, wherein the first category is a power currents category identifying top charted multimedia and the second category is a secondary currents category identifying either newly released multimedia increasing in popularity or familiar multimedia decreasing in popularity.

15. A non-transitory computer-usable medium embodying computer program code, the computer program code comprising a computer-executable program of instructions configured for:

retrieving a first set of multimedia content identifiers having a first sequential order and a first category, wherein each of the first set of multimedia content identifiers includes at least one multimedia parameter;

retrieving a second set of multimedia content identifiers having a second sequential order and a second category, wherein each of the second set of multimedia content identifiers includes at least one multimedia parameter, wherein a ratio of the number of multimedia content identifiers in the first set to the number of multimedia content identifiers in the second set is based on licensing fees of the multimedia content;

combining the first set and the second set of the multimedia content identifiers on a scheduling order based on the first category and the second category to produce at least a portion of a chronological scheduling order;

when a conflict occurs with the at least one multimedia parameter of one of the first set of the multimedia content identifiers and the at least one multimedia parameter of one of the second set of the multimedia content identifiers by having equivalent data values within a predetermined number of slot values of the at least the portion of the chronological scheduling order:

producing a modified chronological scheduling order by exchanging a position of either of the one of the first set and the one of the second set of the multimedia content identifiers with another corresponding one of the either of the first set and the second set of the multimedia content identifiers based upon the predetermined number of slot values to resolve the conflict;

scheduling the multimedia content based on the modified chronological scheduling order; and airplaying the multimedia content.

16. The non-transitory computer-usable medium of claim 15, wherein the at least one multimedia parameter comprises at least one of:
multimedia genre data;
multimedia artist data;
multimedia author data; and
multimedia album data.

17. The non-transitory computer-usable medium of claim 15, wherein the a computer-executable program of instructions further configured for:
modifying the first sequential order or the second sequential order of either of the first set and the second set by exchanging the position of either of the one of the first set and the second set of the multimedia content identifiers.

* * * * *